United States Patent [19]

Suss et al.

[11] Patent Number: 4,558,075
[45] Date of Patent: Dec. 10, 1985

[54] HIGH-SOLIDS COATING COMPOSITION FOR IMPROVED RHEOLOGY CONTROL CONTAINING ORGANO-MODIFIED CLAY

[75] Inventors: Naomi R. Suss, Pittsburgh; Samuel Porter, Jr., Natrona Heights, both of Pa.

[73] Assignee: PPG Industries, Inc., Pittsburgh, Pa.

[21] Appl. No.: 595,131

[22] Filed: Mar. 30, 1984

[51] Int. Cl.[4] .............................................. C08K 3/34
[52] U.S. Cl. .................................... 523/216; 524/445; 524/447
[58] Field of Search ................. 823/216; 524/445, 447

[56] References Cited

U.S. PATENT DOCUMENTS

| | | | |
|---|---|---|---|
| 2,531,427 | 11/1950 | Hauser | 260/448 |
| 2,892,804 | 6/1959 | Crissey | 523/216 |
| 3,974,125 | 8/1976 | Oswald et al. | 523/216 |
| 4,025,474 | 5/1977 | Porter et al. | 260/22 |
| 4,055,607 | 10/1977 | Sullivan et al. | 280/851 |
| 4,075,141 | 2/1978 | Porter et al. | 260/17.2 |
| 4,105,578 | 8/1978 | Finlayson et al. | 252/316 |
| 4,115,472 | 9/1978 | Porter, Jr. et al. | 260/836 |
| 4,147,688 | 4/1979 | Makhlouf et al. | 260/33.6 EP |
| 4,180,489 | 12/1979 | Andrew et al. | 428/402 |
| 4,189,619 | 12/1979 | Makhlouf et al. | 526/202 |
| 4,220,679 | 9/1980 | Backhouse | 427/401 |
| 4,242,384 | 12/1980 | Andrew et al. | 427/421 |
| 4,268,547 | 5/1981 | Backhouse | 427/385.5 |
| 4,290,932 | 9/1981 | Wright | 260/29.6 |
| 4,359,504 | 11/1982 | Troy | 428/403 |
| 4,391,637 | 7/1983 | Mardis et al. | 106/20 |
| 4,412,018 | 10/1983 | Finlayson et al. | 523/508 |
| 4,434,075 | 2/1984 | Mardis et al. | 252/315.2 |
| 4,434,076 | 2/1984 | Mardis et al. | 252/315.2 |
| 4,435,218 | 3/1984 | Jubanowsky | 523/216 |

FOREIGN PATENT DOCUMENTS 2107692  5/1983  United Kingdom .
2107693  5/1983  United Kingdom .

OTHER PUBLICATIONS

Bentone SD-2 Rheological Additive, 1983, NL Industries.

EA 2010 A Super Dispersible Rheological Additive for Medium to High Polarity Systems, Field Test, 1983, NL Chemicals.

"Organo Clays for High Performance Coatings," Journal of Coatings Technology, vol. 56, No. 709, Feb. 1984, pp. 58-60.

Primary Examiner—Lewis T. Jacobs
Attorney, Agent, or Firm—Thomas M. Breininger

[57] ABSTRACT

Disclosed is an essentially solvent-based, organic, high-solids coating composition containing (A) a film-forming binder system containing a crosslinkable resin having a weight average molecular weight of from 300 to 15,000; (B) an organo-modified clay dispersed in the coating composition; and (C) a solvent system for the crosslinkable resin.

Also disclosed is an essentially solvent-based, organic, high-solids coating composition containing (A) a film-forming binder system containing a crosslinkable resin; (B) an organo-modified clay dispersed in the coating composition; (C) a solvent system for the crosslinkable resin; and (D) organic polymeric microparticles which are insoluble in the solvent system for the crosslinkable resin and which have a diameter in the range of from about 0.01 to about 10 microns.

8 Claims, No Drawings

1

HIGH-SOLIDS COATING COMPOSITION FOR IMPROVED RHEOLOGY CONTROL CONTAINING ORGANO-MODIFIED CLAY

BACKGROUND OF THE INVENTION

As the coatings industry, especially the automotive coatings industry, attempts to move to the use of coating compositions having a high content of essentially nonvolatile solids (commonly called high-solids coating compositions) the problems of providing coating compositions having a high solids content which still provide desirable performance characteristics have become increasingly challenging.

One problem arises from the tendency of high-solids thermosetting compositions to sag on a substantially nonhorizontal substrate during the heat curing operation. Such sagging adversely affects the appearance properties of both pigmented and unpigmented cured films. However, the adverse effects of sagging on appearance properties of cured films are particularly severe when the high-solids coating compositions contain metallic-flake pigments. Additionally, whereas some conventional additives for rheology control may provide some measure of sag control, other appearance problems of the cured films to a large degree are not improved by the addition of conventional rheology modifiers. For example, control of pigment orientation (pattern control) in metallic high-solids coatings so as to provide an acceptable "brightness of face" or "lightness of face" in the cured films along with a desirable variable appearance of the coated substrate as it is viewed from different angles to a direction normal to the surface is particularly difficult where high-solids coating compositions are utilized. Moreover, some materials such as pyrogenic silicas which have been advocated for alleviating sag control problems in high-solids coating applications, while providing a measure of sag control, do not allow for both an adequate degree of pattern control and an adequate degree of gloss of the cured films prepared from coating compositions containing pyrogenic silicas. That is, when employed at a level which will provide a reasonable degree of pattern control, pyrogenic silicas tend to greatly lower the degree of gloss of the cured film. This performance disadvantage of materials like pyrogenic silicas is especially important considering the high gloss requirements for coating compositions for use in automotive applications.

Additionally it is important that a high-solids coating composition have an acceptable degree of storage stability. That is, the performance characteristics of the coating compositions should not be seriously affected by storage of the compositions for reasonable periods of time between preparation of the compositions and use, under various storage conditions which can exist where such compositions are customarily employed.

It has now been found that alleviation of the above problems can be obtained by the incorporation in a high solids coating composition of an effective amount of an organo-modified clay, preferably in combination with organic polymer microparticles.

SUMMARY OF THE PRESENT INVENTION

The present invention provides for an essentially solvent-based, organic, high-solids coating composition which is sprayable at high solids comprising:

(A) a film-forming binder system containing a crosslinkable resin having a weight average molecular weight of from 300 to 15,000, and optionally a crosslinking agent for the crosslinkable resin;

(B) an organo-modified clay stably dispersed in the coating composition; and (C) a solvent system for the crosslinkable resin and the optional crosslinking agent.

The present invention also provides for an essentially organic solvent-based, high-solids coating composition which is sprayable at high solids comprising:

(A) a film-forming binder system containing a crosslinkable resin, and optionally a crosslinking agent for the crosslinkable resin;

(B) an organo-modified clay stably dispersed in the coating composition;

(C) a solvent system for the crosslinkable resin and the optional crosslinking agent; and (D) organic polymeric microparticles which are insoluble in the solvent system for the crosslinkable resin and which have a diameter in the range of from about 0.01 to about 10 microns.

DETAILED DESCRIPTION OF THE INVENTION

The binder system of a coating composition of the invention contains a crosslinkable resin. Typically the crosslinkable resin has a weight average molecular weight of from 300 to 15,000, preferably of from 300 to 10,000. Typically, the crosslinkable resin constitutes a major portion of the binder system of a coating composition of the invention, wherein the binder system is understood to mean the nonvolatile portion of the coating composition vehicle. The vehicle is understood to include the binder and volatile components such as solvents and diluents and is understood to exclude coating composition ingredients such as pigments and fillers. Thus, for example, the binder system would include film-forming resins from whatever source and would exclude such coating composition ingredients as volatile materials like solvents and diluents and materials such as pigments and fillers. By "major portion of the binder system" is meant at least 50 percent by weight of the binder system.

The crosslinkable resin may be any crosslinkable resin suitable for use in an essentially solvent-based, organic, high-solids coating composition. Often such crosslinkable resins are referred to as "thermosetting resins". As used herein, the term "crosslinkable resin" is intended to include not only those resins capable of being crosslinked upon application of heat but also those resins which are capable of being crosslinked without the application of heat. Examples of such crosslinkable resins include the generally known thermosetting acrylics, aminoplasts, urethanes, polyesters, and polyamides. These resins, when desired, may also contain functional groups characteristic of more than one class, as for example, polyester amides, uralkyds, urethane acrylates, urethane amide acrylates, etc.

Acrylic resins refer to the generally known addition polymers and copolymers of acrylic and methacrylic acids and their ester derivatives, acrylamide and methacrylamide, and acrylonitrile and methacrylonitrile. Examples of ester derivatives of acrylic and methacrylic acids include such alkyl acrylates and alkyl methacrylates as ethyl, methyl, propyl, butyl, hexyl, ethylhexyl and lauryl acrylates and methacrylates, as well as similar esters, having up to about 20 carbon atoms in the alkyl group. Also, hydroxyalkyl esters can readily be employed. Examples of such hydroxyalkyl esters include 2-hydroxyethyl acrylate, 2-hydroxypropyl acrylate, 2-hydroxyethyl methacrylate, 2-hydroxypropyl methacrylate, 3-hydroxypropyl-4-hydroxybutyl methacrylate, and mixtures of such esters having up to about 5 carbon atoms in the alkyl group. In some instances, corresponding esters of other unsaturated acids, for example, ethacrylic acid, crotonic acid, and other similar acids having up to about 6 carbon atoms can be employed. Where desired, various other ethylenically unsaturated monomers can be utilized in the preparation of acrylic resins examples of which include: vinyl aromatic hydrocarbons optionally bearing halo substituents such as styrene, alpha-methyl styrene, vinyl toluene, alpha-chlorostyrene, alpha-bromostyrene, and parafluorostyrene; nonaromatic monoolefinic and diolefinic hydrocarbons optionally bearing halo substituents such as isobutylene, 2,3-dimethyl-1-hexene, 1,3-butadiene, chloroethylene, chlorobutadiene and the like; unsaturated organosilanes such as gamma-methacryloxypropyltriethoxysilane, gamma-acryloxypropyltriethoxysilane, vinyltrimethoxy and the like; esters of organic and inorganic acids such as vinyl acetate, vinyl propionate, and ispropenyl acetate; and vinyl chloride, allyl chloride, vinyl alpha-chloroacetate, dimethyl maleate and the like.

The above polymerizable monomers are mentioned as representative of the $CH_2=C<$ containing monomers which may be employed; but essentially any co-polymerizable monomer can be used.

Aminoplast resins refer to the generally known condensation products of an aldehyde with an amino- or amido-group containing substance examples of which include the reaction products of formaldehyde, acetaldehyde, crotonaldehyde, benzaldehyde and mixtures thereof with urea, melamine, or benzoguanimine. Preferred aminoplast resins include the etherified (i.e., alkylated) products obtained from the reaction of alcohols and formaldehyde with urea, melamine, or benzoguanimine. Examples of suitable alcohols for preparing these etherified products include: methanol, ethanol, propanol, butanol, hexanol, benzylalcohol, cyclohexanol, 3-chloropropanol, and ethoxyethanol.

Urethane resins refer to the generally known thermosetting urethane resins prepared from organic polyisocyanates and organic compounds containing active hydrogen atoms as found for example in hydroxyl, and amino moieties. Some examples of urethane resins typically utilized in one-pack coating compositions include: the isocyanate-modified alkyd resins sometimes referred to as "uralkyds"; the isocyanate-modified drying oils commonly referred to as "urethane oils" which cure with a drier in the presence of oxygen in air; and isocyanate-terminated prepolymers typically prepared from an excess of one or more organic polyisocyanates and one or more polyols including, for example, simple diols, triols and higher alcohols, polyester polyols and polyether polyols. Some examples of systems based on urethane resins typically utilized as two-pack coating compositions include an organic polyisocyanate or isocyanate-terminated prepolymer (first pack) in combination with a substance (second pack) containing active hydrogen as in hydroxyl or amino groups along with a catalyst (e.g., an organotin salt such as dibutyltin dilaurate or an organic amine such as triethylamine or 1,4-diazobicyclo-(2:2:2) octane). The active hydrogen-containing substance in the second pack typically is a polyester polyol, a polyether polyol, or an acrylic polyol known for use in such two-pack urethane resin systems. Many coating compositions based on urethanes (and their preparation) are described extensively in Chapter X Coatings, pages 453-607 of *Polyurethanes: Chemistry and Technology, Part II* by H. Saunders and K. C. Frisch, Interscience Publishers (N.Y., 1964).

Polyester resins are generally known and are prepared by conventional techniques utilizing polyhydric alcohols and polycarboxylic acids. Examples of suitable polyhydric alcohols include: ethylene glycol; propylene glycol; diethylene glycol; dipropylene glycol; butylene glycol; glycerol; trimethylolpropane; pentaerythritol; sorbitol; 1,6-hexanediol; 1,4-cyclohexanediol; 1,4-cyclohexanedimethanol; 1,2-bis(hydroxyethyl)cyclohexane; and 2,2-dimethyl-3-hydroxypropyl-2,2-dimethyl-3-hydroxypropionate. Examples of suitable polycarboxylic acids include: phthalic acid; isophthalic acid; terephthalic acid; trimellitic acid; tetrahydrophthalic acid; hexahydrophthalic acid; tetrachlorophthalic acid; adipic acid; azelaic acid; sebacic acid; succinic acid; maleic acid; glutaric acid; malonic acid; pimelic acid; suberic acid; 2-2-dimethylsuccinic acid; 3,3-dimethylglutaric acid; 2,2-dimethylglutaric acid; maleic acid; fumaric acid; and itaconic acid. Anhydrides of the above acids, where they exist, can also be employed and are encompassed by the term "polycarboxylic acid." In addition, certain substances which react in a manner similar to acids to form polyesters are also useful. Such substances include lactones such as caprolactone, propylolactone and methyl caprolactone, and hydroxy acids such as hydroxy caproic acid and dimethylol propionic acid. If a triol or higher hydric alcohol is used, a monocarboxylic acid, such as acetic acid and benzoic acid may be used in the preparation of the polyester resin. Moreover, polyesters are intended to include polyesters modified with fatty acids or glyceride oils of fatty acids (i.e., conventional alkyd resins). Alkyd resins typically are produced by reacting the polyhydric alcohols, polycarboxylic acids, and fatty acids derived from drying, semi-drying, and non-drying oils in various proportions in the presence of a catalyst such as litharge, sulfuric acid, or a sulfonic acid to effect esterification. Examples of suitable fatty acids include saturated and unsaturated acids such as stearic acid, oleic acid, ricinoleic acid, palmitic acid, linoleic acid, linolenic acid, licanic acid, elaeostearic acid, and clupanodonic acid.

Epoxy resins, often referred to simply as "epoxies", are generally known and refer to compounds or mixtures of compounds containing more than one 1,2-epoxy group of the formula

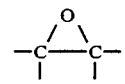

i.e., polyepoxides. The polyepoxides may be saturated or unsaturated, aliphatic, cycloaliphatic, aromatic or heterocyclic. Examples of suitable polyepoxides include the generally known polyglycidyl ethers of polyphenols and/or polyepoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali.

Examples of suitable polyphenols include: 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane; and the hydrogenated derivatives thereof. The polyglycidyl ethers of polyphenols of various molecular weights may be produced, for example, by varying the mole ratio of epichlorohydrin to polyphenol in known manner.

Epoxy resins also include the polyglycidyl ethers of mononuclear polyhydric phenols such as the polyglycidyl ethers of resorcinol, pyrogallol, hydroquinone, and pyrocatechol.

Epoxy resins also include the polyglycidyl ethers of polyhydric alcohols such as the reaction products of epichlorohydrin or dichlorohydrin with aliphatic and cycloaliphatic compounds containing from two to four hydroxyl groups including, for example, ethylene glycol, diethylene glycol, triethylene glycol, dipropylene glycol, tripropylene glycol, propane diols, butane diols, pentane diols, glycerol, 1,2,6-hexanetriol, pentaerythritol, and 2,2-bis(4-hydroxycyclohexyl)propane.

Epoxy resins additionally include polyglycidyl esters of polycarboxylic acids such as the generally known polyglycidyl esters of adipic acid, phthalic acid, and the like.

Addition polymerized resins containing epoxy groups may also be employed. These polyepoxides may be produced by the addition polymerization of epoxy functional monomers such as glycidyl acrylate, glycidyl methacrylate and allyl glycidyl ether optionally in combination with ethylenically unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate, and isobornyl methacrylate.

Many additional examples of epoxy resins are described in the *Handbook of Epoxy Resins,* Henry Lee and Kris Neville, 1967, McGraw Hill Book Company.

When desired, generally known crosslinking agents can be incorporated in a composition of the invention particularly when the crosslinkable resin comprises a thermosetting resin containing active hydrogen atoms for example from moieties such as hydroxyl, carboxyl, amino, and amido.

As will be appreciated by one skilled in the art, the choice of crosslinking agent depends on various factors such as compatibility with the film-forming resin, the particular type of functional groups on the film-forming resin and the like. The crosslinking agent may be used to crosslink the film-forming resin either by condensation or addition or both. When for example the thermosetting reactants can be crosslinked in the presence of moisture or when the thermosetting reactants include monomers having complementary groups capable of entering into crosslinking reactions, the crosslinking agent may be omitted if desired.

Representative examples of crosslinking agents include blocked and/or unblocked diisocyanates, diepoxides, aminoplasts, phenoplasts and silane crosslinking agents. When aminoplast resins are employed as crosslinking agents, particularly suitable are the melamine-formaldehyde condensates in which a substantial proportion of the methylol groups have been etherified by reaction with a monohydric alcohol such as those set forth previously in the description of aminoplast resins suitable for use as crosslinkable resins in compositions of the invention.

The term "solvent system" as used herein, for example in the phrase "solvent system for the crosslinkable resin and optional crosslinking agent", is employed in a broad sense and is intended to include true solvents as well as liquid diluents for the crosslinkable resin and optional crosslinking agent which are not true solvents for these components. The solvent system generally is organic. It may be a single compound or a mixture of compounds. Ordinarily the solvent system does not comprise water. However when the solvent system does comprise both water and an organic portion, the components are usually miscible in the proportions employed. The relationship between the solvent system and the crosslinkable resin and also between the solvent system and the organo-modified clay (described infra) depends upon the absolute and relative natures of these materials and upon the relative amounts used. Such factors as solubility, miscibility, polarity, hydrophilicity, hydrophobicity, lyophilicity and lyophobicity are some of the factors which may be considered. Illustrative of suitable components of the solvent system which may be employed are alcohols such as lower alkanols containing 1 to 8 carbon atoms including methanol, ethanol, propanol, isopropanol, butanol, sec-butyl alcohol, tert-butyl alcohol, amyl alcohol, hexyl alcohol and 2-ethylhexyl alcohol; ethers and ether alcohols such as ethylene glycol monoethyl ether, ethylene glycol monobutyl ether, ethylene glycol dibutyl ether, propylene glycol monomethyl ether, diethylene glycol monobutyl ether, diethylene glycol dibutyl ether, dipropylene glycol monoethyl ether, and dipropylene glycol monobutyl ether; ketones such as acetone, cyclohexane, methyl ethyl ketone, methyl isobutyl ketone, methyl amyl ketone and methyl N-butyl ketone; esters such as ethyl acetate butyl acetate, 2-ethoxyethyl acetate and 2-ethylhexyl acetate; aliphatic and alicyclic hydrocarbons such as the various petroleum naphthas and cyclohexane; aromatic hydrocarbons such as benzene, ethyl benzene, toluene and xylene; chlorinated hydrocarbon solvents such as methylene chloride, chloroform, carbontetrachloride, chloroethane, and 1,1,1-trichloroethane; and water.

As will be appreciated by one skilled in the art, the organic solvents, examples of which have been described previously, suitable for the solvent system in the method of the present invention may be broadly classified into five categories which include aliphatic, aromatic, moderately polar, highly polar and chlorinated solvents. Essentially nonpolar aliphatic solvents include normal and branched chain aliphatic hydrocarbons having from about 5 to 12 carbon atoms and cycloaliphatic compounds. Essentially nonpolar aromatic solvents include such materials as benzene, toluene, xylene and ethyl benzene. Moderately polar solvents include ketonic and ester solvents such as acetone, methylethylketone, methylbutylketone, methylisobutylketone, cyclohexanone, ethyl acetate, butyl acetate, ethoxyethyl acetate, and the like. Highly polar solvents include such materials as low molecular weight alcohols such as methanol, ethanol, propanol, 2-propanol, butanol, 2-butanol, and ethoxyethanol. Chlorinated hydrocarbon solvents include such materials as methylene chloride, chloroform, carbon tetrachloride, chloroethane and 1,1,1-trichloroethane.

Ordinarily a composition of the invention also contains a pigment. Examples of opacifying pigments include titaniuam dioxide (rutile or anatase), zinc oxide, zirconium oxide, zinc sulfide, and lithopone. Examples of coloring pigments include iron oxides, cadmium sulfide, carbon black, phthalocyanine blue, phthalocyanine green, indanthrone blue, ultramarine blue, chromium oxide, burnt umber, benzidine yellow and toluidine red. Examples of reactive pigments include silicate-treated barium metaborate, strontium chromate and lead chromate. Examples of extender pigments include pigmentary silica, barytes, calcium carbonate, barium sulfate, talc, aluminum silicates, sodium aluminum silicates, potassium aluminum silicates and magnesium silicates. Metallic pigments include metallic powders and metallic flakes. Examples of metallic powders include aluminum powder, copper powder, bronze powder and zinc dust. Examples of metallic flakes include aluminum flakes, nickel flakes, copper flakes, bronze flakes, brass flakes and chromium flakes. A single pigment may be used or mixtures of pigments may be employed. It is preferred that at least a portion of the pigment particles be metallic flakes. The metallic flakes usually comprise aluminum flakes.

The principles respecting the formation of solutions, dispersions, pseudodispersions, and emulsions of film-forming resins are generally known in the art. Any of these systems may be utilized in the compositions of the invention.

An organic, high-solids coating composition of the invention contains particles of organo-modified clay dispersed therein. The organo-modified clays which are suitable in the high-solids coating composition of the present invention are produced from the reaction of an organic cation, organic anion and smectite-type clay. The clays used to prepare these organo-modified clays are smectite-type clays which have a cation exchange capacity of at least 75 milliequivalents per 100 grams of clay. Particularly desirable types of clay are the naturally occurring Wyoming varieties of swelling bentonites and like clays and hectorite, a swelling magnesium-lithium silicate clay.

The clays, especially the bentonite type clays, are preferably converted to the sodium form if they are not already in this form. This can conveniently be done by preparing an aqueous clay slurry and passing the slurry through a bed of cation exchange resin in the sodium form. Alternatively, the clay can be mixed with water and a soluble sodium compound such as sodium carbonate, sodium hydroxide and the like, followed by shearing the mixture with a pugmill or extruder.

Smectite-type clays prepared naturally or synthetically by either a pneumatolytic or, preferably a hydrothermal synthesis process can also be used to prepare the organophilic, organo-modified clays suitable for the present invention. Representative of such clays are montmorillonite, bentonite, beidellite, hectorite, saponite, and stevensite. These clays may be synthesized hydrothermally by forming an aqueous reaction mixture in the form of a slurry containing mixed hydrous oxides or hydroxides of the desired metal with or without, as the case may be, sodium (or alternate exchangeable cation or mixture thereof) fluoride in the proportions for the particular synthetic smectite desired. The slurry is then placed in an autoclave and heated under autogenous pressure to a temperature within the range of approximately 100° to 325° C., preferably 274° to 300° C., for a sufficient period of time to form the desired product.

The cation exchange capacity of the smectite-type clays can be determined by the well-known ammonium acetate method.

Organo-modified clays of one preferred type which do not require the addition of polar solvent activators (such as acetone, alcohols and the like) for use in the high-solids coating composition of the present invention are produced from the reaction of the smectite-type clay with an organic cation and an organic anion described below. Additional description may be obtained from U.S. Pat. No. 4,412,018 which is hereby incorporated by reference.

The organic cationic compounds which are useful in preparing these preferred organo-modified clays suitable for a high-solids coating composition of the present invention may be selected from a wide range of materials which are capable of forming an organophilic clay by exchange of cations with the smectite-type clay. The organic cationic compound generally has a positive charge localized on a single atom or on a small group of atoms within the compound. Preferably the organic cation is selected from the group consisting of quaternary ammonium salts, phosphonium salts, sulfonium salts and mixtures thereof wherein the organic cation contains at least one lineal or branched alkyl group having 12 to 22 carbon atoms. The remaining moieties on the central positively charged atoms are chosen from (a) lineal or branched alkyl groups having 1 to 22 carbon atoms; (b) aralkyl groups, that is benzyl and substituted benzyl moieties including fused ring moieties having lineal or branched alkyl groups having 1 to 22 carbon atoms in the alkyl portion of the structure; (c) aryl groups such as phenyl and substituted phenyl including fused ring aromatic substituents; and (d) hydrogen.

The long chain alkyl radicals containing at least one group having 12 to 22 carbon atoms may be derived from naturally occurring oils including various vegetable oils, such as corn oil, coconut oil, soybean oil, cottonseed oil, castor oil and the like, as well as various animal oils or fats such as tallow oil. The alkyl radicals may likewise be petrochemically derived such as from alpha olefins. Additional exemplary radicals include methyl, ethyl, decyl, lauryl, and stearyl.

Additional examples of aralkyl groups, that is benzyl and substituted benzyl moieties would include those materials derived from, e.g. benzyl halides, benzhydryl halides, trityl halides, alpha-halo-alpha-phenylalkanes wherein the alkyl chain has from 1 to 22 carbon atoms such as 1-halo-1-phenylethane, 1-halo-1-phenyl propane, and 1-halo-1-phenyloctadecane; substituted benzyl moieties such as would be derived from ortho, meta and para-chlorobenzyl halides, para-methoxybenzyl halides, ortho, meta and para-methoxybenzyl halides, ortho, meta and para-nitrilobenzyl halides, and ortho, meta and para-alkylbenzyl halides wherein the alkyl chain contains from 1 to 22 carbon atoms; and fused ring benzyl-type moieties such as would be derived from 2-halomethylnaphthalene, 9-halomethylanthracene and 9-halomethylphenanthrene, wherein the halo group would be defined as chloro, bromo, iodo, or any other such group which serves as a leaving group in the nucleophilic attack of the benzyl type moiety such that the nucleophile replaces the leaving group on the benzyl type moiety.

Examples of aryl groups would include phenyl such as in N-alkyl and N,N-dialkyl anilines, wherein the alkyl groups contain between 1 and 22 carbon atoms; ortho, meta and para-nitrophenyl, ortho, meta and para-alkyl phenyl, wherein the alkyl group contains between 1 and 22 carbon atoms, 2-, 3-, and 4-halophenyl wherein the halo group is defined as chloro, bromo, or iodo, and 2-, 3-, and 4-carboxyphenyl and esters thereof, where the alcohol of the ester is derived from an alkyl alcohol, wherein the alkyl group contains between 1 and 22 carbon atoms, aryl such as a phenol, or aralkyl such as benzyl alcohols; fused ring aryl moieties such as naphthalene, anthracene, and phenanthrene.

Many processes are known to prepare organic cationic salts. For example when preparing a quaternary ammonium salt one skilled in the art would prepare a dialkyl secondary amine, for example, by the hydrogenation of nitriles, see U.S. Pat. No. 2,355,356; form the methyl dialkyl tertiary amine by reductive alkylation using formaldehyde as the source of methyl radical. Also see Shapiro et al U.S. Pat. No. 3,136,819 for forming the quaternary amine halide by adding benzyl chloride or benzyl bromide to the tertiary amine as well as Shapiro et al U.S. Pat. No. 2,775,617. The salt anion is preferably selected from the group consisting of chloride and bromide, and mixtures thereof, and is more preferably chloride, although other anions such as acetate, hydroxide, nitrite, etc., may be present in the organic cationic compound to neutralize the cation.

These organic cationic compounds can be represented by the formulas:

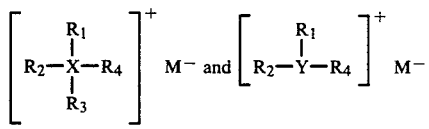

wherein X is nitrogen or phosphorus, Y is sulfur, M⁻ is selected from the group consisting of chloride, bromide, iodide, nitrite, hydroxide, acetate, methyl sulfate, and mixtures thereof; and wherein $R_1$ is an alkyl group having 12 to 22 carbon atoms; and wherein $R_2$, $R_3$ and $R_4$ are selected from the group consisting of hydrogen; alkyl groups containing 1 to 22 carbon atoms; aryl groups; aralkyl groups containing 1 to 22 carbon atoms on the alkyl chain, and mixtures thereof.

The organic anions useful in preparing these preferred organo-modified clays suitable for the high-solids coating composition of the present invention may be selected from a wide range of materials providing they are capable of reacting with the above-described organic cation and form intercalations with a smectite-type clay as an organic cation-organic anion complex. The molecular weight (gram molecular weight) of the organic anion is typically 3,000 or less, and usually 1,000 or less and contains at least one acidic moiety per molecule as disclosed herein. The organic anion is preferably derived from an organic moiety having a $pK_A$ less than about 11.0. As indicated, the source acid must contain at least one ionizable hydrogen having the preferred $pK_A$ in order to allow the formation of the organic cation-organic anion complex and subsequent intercalation reaction to occur.

Also useable is any compound which will provide the desired organic anion on hydrolysis. Representative compounds include:

(1) acid anhydrides including acetic anhydride, maleic anhydride, succinic anhydride and phthalic anhydride;

(2) acid halides including acetylchloride, octanoyl chloride, lauroyl chloride, lauroyl bromide and benzoyl bromide;

(3) 1,1,1-trihalides including 1,1,1-trichloroethane and 1,1,1-tribromooctane; and (4) orthoesters including ethylorthoformate, and ethylorthostearate.

The organic anions may be in the acid or salt form. Salts may be selected from alkali metal salts, alkaline earth salts, ammonia, and organic amines. Representative salts include: hydrogen, lithium, sodium, potassium, magnesium, calcium, barium, ammonium and organic amines such as ethanolamine, diethanolaine, triethanolamine, methyl diethanolamine, butyl diethanolamine, diethyl amine, dimethyl amine, triethyl amine, dibutyl amine, and so forth, and mixtures thereof. The most preferred salt is sodium as the alkali metal salt.

Exemplary types of suitable acidic functional organic compounds useful in this invention include:

(1) carboxylic acids including:

(a) benzene carboxylic acids such as benzoic acid, ortho, meta and para-phthalic acid, 1,2,3-benzene tricarboxylic acid; 1,2,4-benzene tricarboxylic acid; 1,3,5-benzenetricarboxylic acid; 1,2,4,5-benzene tetracarboxylic acid; 1,2,3,4,5,6-benzene hexacarboxylic acid (mellitic acid);

(b) alkyl carboxylic acids having the formula $H—(CH_2)_n—COOH$, wherein n is a number from 1 to 22, such compounds include acetic acid; propionic acid; butanoic acid; pentanoic acid; hexanoic acid; heptanoic acid; octanoic acid; nonamoic acid; decanoic acid; undecanoic acid; lauric acid, tridecanoic acid; tetradecanoic acid; pentadecanoic acid; hexadecanoic acid; heptadecanoic acid; octadecanoic acid (stearic acid); nonadecanic acid; eicosonic acid;

(c) alkyl dicarboxylic acids having the formula $HOOC—(CH_2)_n—COOH$, wherein n is 1 to 8 such as oxalic acid; malonic acid; succinic acid; glutaric acid; adipic acid; pimelic acid; suberic acid; acelaic acid; sacic acid;

(d) hydroxyalkyl carboxylic acids such as citric acid; tartaric acids, malic acid; mandelic acid; and 12-hydroxystearic acid;

(e) unsaturated alkyl carboxylic acids such as maleic acid; fumaric acid; and cinnamic acid;

(f) fused ring aromatic carboxylic acids such as naphthalenic acid; and anthracene carboxylic acid.

(g) cycloaliphatic acids such as cyclohexane carboxylic acid; cyclopentane carboxylic acid; and furan carboxylic acids.

(2) organic sulfuric acids including:

(a) sulfonic acids including:

(1) benzene sulfonic acids such as benzene sulfonic acid; phenol sulfonic acid; dodecylbenzene sulfonic acid; benzene disulfonic acid, benzene trisulfonic acids; para-toluene sulfonic acid; and (2) alkyl sulfonic acids such as methane sulfonic acid; ethane sulfonic acid; butane sulfonic acid; butane disulfonic acid; sulfosuccinate alkyl esters such as dioctyl succinyl sulfonic acid; and alkyl polyethoxysuccinyl sulfonic acid; and (b) alkyl sulfates such as the lauryl half ester of sulfuric acid and the octadecyl half ester of sulfuric acid.

(3) organophosphorus acids including:

(a) phosphinic acids have the formula:

wherein R is an aryl group or alkyl having 1 to 22 carbon atoms;

(b) phosphinic acids having the formula:

wherein R is an aryl group or alkyl group having 1 to 22 carbon atoms, such as dicyclohexyl phosphinic acid; dibutyl phosphinic acid; and dilauryl phosphinic acid;

(c) thiophosphinic acids having the formula:

wherein R is an aryl group or alkyl group having 1 to 22 carbon atoms such as di-isobutyl dithiophosphinic acid; dibutyl dithiophosphinic acid; dioctadecyl dithiophosphinic acid;

(d) phosphites, that is diesters of phosphorous acid having the formula: HO—P(OR)$_2$ wherein R is an alkyl group having 1 to 22 carbon atoms such as dioltadecylphosphite;

(e) phosphates, that is diesters of phosphoric acid having the formula:

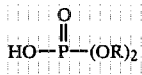

wherein R is an alkyl group having 1 to 22 carbon atoms, such as dioctadecyl phosphate;

(4) Phenols such as phenol; hydroquinone, t-butylcatechol; p-methoxyphenol; and naphthols;

(5) thioacids having the formula:

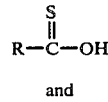

and

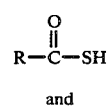

and

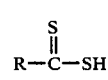

wherein R is an aryl group or alkyl group having 1 to 22 carbon atoms, such as thiosalicyclic acid; thiobenzoic acid; thioacetic acid; thiolauric acid; and thiostearic acid;

(6) Amino acids such as the naturally occurring amino acids and derivatives thereof such as 6-aminohexanoic acid; 12-aminododecanoic acid; N-phenylglycine; and 3-aminocrotonoic acid;

(7) Polymeric acids prepared from acidic monomers wherein the acidic function remains in the polymer chain such as low molecular weight acrylic acid polymers and copolymers; and styrene maleic anhydride copolymers;

(8) Miscellaneous acids and acid salts such as ferrocyanide; ferricyanide; sodium tetraphenylborate; phosphotungstic acid; phosphosilicic acid, or any other such anion which will form a tight ion pair with an organic cation, i.e., any such anion which forms a water insoluble precipitate with an organic cation.

The organophilic, organo-modified clays suitable for use in the high-solids coating composition of the present invention can be prepared by admixing the clay, organic cation, organic anion and water together, preferably at a temperature within the range from 20° C. to 100° C., more preferably 60° C. to 77° C. for a period of time sufficient for the organic cation and organic anion complex to intercalate with the clay particles, followed by filtering, washing, drying and grinding. The addition of the organic cation and organic anion may be done either separately or as a complex. In using the organophilic clays in emulsions, the drying and grinding steps may be eliminated. When admixing the clay, organic cation, organic anion and water together in such concentrations that a slurry is not formed, then the filtration and washing steps can be eliminated.

The clay is preferably dispersed in water at a concentration of from about 1% to 80% and preferably 2% to 7%, the slurry optionally centrifuged to remove non-clay impurities which constitute about 10% to about 50% of the starting clay composition, the slurry agitated and heated to a temperature in the range from 60° C. to 77° C.

The organophilic, organo-modified clays suitable for use in the high-solids coating composition of the present invention may be prepared by admixing the organic anion with a clay and water together, preferably at a temperature between 20° C. and 100° C. for a sufficient time to prepare a homogenous mixture followed by the addition of the organic cation in sufficient amounts to satisfy the cation exchange capacity of the clay and the cationic capacity of the organic anion. The mixture is reached with agitation at a temperature between 20° C. and 100° C. for a sufficient time to allow the formation of an organic cation-organic anion complex which is intercalated with the clay and the cation exchange sites of the clay are substituted with the organic cation. Reaction temperatures below 20° C. or above 100° C. while useable are not preferred because of the need for additional processing apparatus, namely cooling devices and pressure reactors.

The amount of organic anion added to the clay for purposes of preparing suitable organo-modified clays for the high-solids coating composition of the present invention should be sufficient to impart to the organophilic, organo-modified clay, desirable enhanced dispersion characteristics. This amount is defined as the milliequivalent ratio which the number of milliequivalents (M.E.) of the organic anion in the organoclay per 100 grams of clay, 100% active clay basis. The organophilic, organo-modified clays suitable for the method of the present invention, should have an anion milliequivalent ratio of 5 to 100 and preferably 10 to 50. At lower anion milliequivalent ratios the enhanced dispersibility and efficiency of the organophilic, organo-modified clays, are negligible. At higher anion M.E. ratios the efficiency of the organophilic, organo-modified clay reaction product is reduced from nonintercalated organic cation-organic anion complexes or ion pairs.

The organic anion is preferably added to the reactants in the desired milliequivalent ratio as a solid or solution in water under agitation to effect a macroscopically homogenous mixture.

The organic cation is employed in a sufficient quantity to at least satisfy the cation exchange capacity of the clay and the cationic activity of the organic anion. Additional cation above the sum of the exchange capacity of the clay and anion may be optionally used. It has been found when using the smectite-type clays that use of at least 90 milliequivalents of organic cation is sufficient to satisfy at least a portion of the total organic cation requirement. Use of amounts of from 80 to 200 M.E., and preferably 100 to 160 M.E. are acceptable. At lower milliequivalent ratios incomplete reaction between the organic cation and clay or organic anion will occur resulting in the formation of products which are not suitable for the method of the present invention.

A typical process for preparing an organophilic, organo-modified clay may be described more particularly by the following steps which involve: (a) preparing a slurry of smectite-type clay in water at 1 to 80% by weight of the smectite-type clay; (b) heating the slurry to a temperature between 20° C. and 100° C.; (c) adding 5 to 100 milliequivalents of an organic anion per 100 grams of clay, 100% active clay basis and an organic cation in a sufficient amount to satisfy the cation exchange capacity of the smectite-type clay and the cationic activity of the organic anion while agitating the reaction solution; (d) continuing the reaction for a sufficient time to form a reaction product comprising an organic cation-organic anion complex which is intercalated with the smectite-type clay and the cation exchange sites of the smectite-type clay are substituted with the organic cation; and (e) recovering the reaction product.

When organo-modified clays of the preferred type described above are utilized in the high-solids coating composition of the invention it is also preferred that the solvent system be based on moderately to highly polar solvents such as the alcohols, ethers and ether alcohols, ketones, and esters, examples of which are described above. Moderately to highly polar solvents are preferred for this embodiment because of the increased effectiveness of the organo-modified clay as a pattern control agent when employed in the high-solids coating composition of the present invention in which the solvent system is based essentially on such moderately to highly polar solvents.

Additional preferred examples of organo-modified clays, which also do not require the addition of polar solvent activators, which may be employed in the high-solids coating composition of the present invention particularly when the solvent system is based on moderately polar solvents or on essentially nonpolar aromatic and nonpolar aliphatic solvents include those described in U.S. Pat. No. 4,391,637 and published U.K. patent application No. GB2107692A which are hereby incorporated by reference. The organo-modified clays described therein while effective in moderately polar solvents, are particularly effective in both nonpolar aliphatic and aromatic solvents. Clays suitable for preparation of these organo-modified clays are the same smectite-type clays as those described previously herein. These organo-modified clays comprise the reaction product of the smectite-type clay and an organic cationic compound having at least one long chain alkyl group and at least one group selected from a beta,gamma-unsaturated alkyl group or a hydroxyalkyl group having 2 to 6 carbon atoms. Some examples of these organo-modified clays particularly useful in essentially non-polar aromatic and aliphatic solvent systems include reaction products of an organic cationic compound and a smectite-type clay having a cation exchange capacity of at least 75 milliequivalents per 100 grams of the clay, wherein the organic cationic compound contains (a) a first member selected from the group consisting of a beta,gamma-unsaturated alkyl group and a hydroxyalkyl group having 2 to 6 carbon atoms and mixtures thereof, (b) a second member comprising a long chain alkyl group having 12 to 60 carbon atoms and (c) a third and fourth member selected from a member of group (a) above, an aralkyl group, and an alkyl group having 1 to 22 carbon atoms and mixtures thereof; and wherein the amount of the organic cationic compound is from 90 to 140 milliequivalents per 100 grams of the smectite-type clay, 100% active clay basis.

As discussed above the smectite-type clays and their preparation suitable for the preparation of these organophilic, organo-modified clays which are particularly compatible with essentially non-polar aromatic and aliphatic solvents are the same as the smectite-type clays described above which are suitable for preparation of the organophilic, organo-modified clays which are particularly compatible with moderate to highly polar solvents.

The organic cationic compounds useful for preparation of the organophilic, organo-modifed clays which are especially compatible with essentially non-polar aromatic and aliphatic solvents, may be selected from a wide range of materials that are capable of forming an organophilic clay by exchange of cations with the smectite-type clay. The organic cationic compound generally has a positive charge localized on a single atom or on a small group of atoms within the compound. Preferably the organic cation is selected from the group consisting of quarternary ammonium salts, phosphonium salts, and mixtures thereof, as well as equivalent salts, and wherein the organic cation contains at least one member selected from (a) a beta,gamma-unsaturated alkyl group and/or a hydroxyalkyl group having 2 to 6 carbon atoms and (b) a long chain alkyl group. The remaining moieties on the central positive atom are chosen from a member from group (a) above or an aralkyl group and/or an alkyl group having from 1 to 22 carbon atoms.

The beta,gamma-unsaturated alkyl group may be selected from a wide range of materials. These compounds may by cyclic or acylic, unsubstituted or substituted with aliphatic radicals containing up to 3 carbon atoms such that the total number of aliphatic carbons in the beta,gamma-unsaturated radical is 6 or less. The beta,gamma-unsaturated alkyl radical may be substituted with an aromatic ring that likewise is conjugated with the unsaturation of the beta,gamma moiety or the beta,gamma-radical is substituted with both an aliphatic radical and an aromatic ring.

Representative examples of cyclic beta,gamma-unsaturated alkyl groups include 2-cyclohexenyl and 2-cyclopentanyl. Representative examples of acyclic beta,gamma-unsaturated alkyl groups containing 6 or less carbon atoms include propargyl, allyl (2-propenyl); crotyl (2-butenyl); 2-pentenyl; 2-hexenyl; 3-methyl-2-butenyl; 3-methyl-2-pentenyl; 2,dimethyl-2-butenyl; 1,1-dimethyl-2-propenyl; 1,2-dimethyl-2-propenyl; 2,4-pentadienyl; and 2,4-hexadienyl. Representative examples of acyclic-aromatic substituted compounds include cinnamyl (3-phenyl-2-propenyl); 2-phenyl-2-propenyl;

and 3-(4-methoxyphenyl)-2-propenyl. Representative examples of aromatic and aliphatic substituted materials include 3-phenyl-2-cyclohexenyl; 3-phenyl-2-cyclopentenyl; 1,1-dimethyl-3-phenyl-2-propenyl; 1,1,2-trimethyl-3-phenyl-2-propenyl; 2,3-dimethyl-3-phenyl-2-propenyl; 3,3-dimethyl-2-phenyl-2-propenyl; and 3-phenyl-2-butenyl.

The hydroxyalkyl group is selected from a hydroxyl substituted aliphatic radical wherein the hydroxyl is not substituted at the carbon adjacent to the positively charged atom, and has from 2 to 6 aliphatic carbons. The alkyl group may be substituted with an aromatic ring. Representative examples include 2-hydroxyethyl (ethanol); 3-hydroxypropyl; 4-hydroxypentyl; 6-hydroxyhexyl; 2-hydroxypropyl (isopropanol); 2-hydroxybutyl; 2-hydroxypentyl; 2-hydroxyhexyl; 2-hydroxycyclohexyl; 3-hydroxycyclohexyl; 4-hydroxycyclohexyl; 2-hydroxycyclopentyl; 3-hydroxycyclopentyl; 2-methyl-2-hydroxypropyl; 1,1,2-trimethyl-2-hydroxypropyl; 2-phenyl-2-hydroxyethyl; 3-methyl-2-hydroxybutyl; and 5-hydroxy-2-pentenyl.

The long chain alkyl radicals may be branched or unbranched, saturated or unsaturated, substituted or unsubstituted and should have from 12 to 60 carbon atoms in the straight chain portion of the radical.

The long chain alkyl radicals may be derived from natural occurring oils including various vegetable oils, such as corn oil, coconut oil, soybean oil, cottonseed oil, castor oil and the like, as well as various animal oils or fats such as tallow oil. The alkyl radicals may likewise be petrochemically derived such as from alpha olefins.

Representative examples of useful branched, saturated radicals include 12-methylstearyl; and 12-ethylstearyl. Representative examples of useful branched, unsaturated radicals include 12-methyloleyl and 12-ethyloleyl. Representative examples of unbranched saturated radicals include lauryl; stearyl; tridecyl; myristal (tetradecyl); pentadecyl; hexadecyl; hydrogenated tallow, docosonyl. Representative examples of unbranched, unsaturated and unsubstituted radicals include oleyl, linoleyl; linolenyl, soya and tallow.

The remaining groups on the positively charged atom are chosen from (a) a member of the group selected from a beta,gamma-unsaturated alkyl group and a hydroxyalkyl group having 2 to 6 carbon atoms, both described above; (b) an alkyl group having 1 to 22 carbon atoms, cyclic and acyclic and (c) an aralkyl group, that is benzyl and substituted benzyl moieties including fused ring moieties having lineal or branched 1 to 22 carbon atoms in the alkyl portion of the structure.

Representative examples of an aralkyl group, that is, benzyl and substituted benzyl moieties would include benzyl and those materials derived from, e.g. benzyl halides, benzhydryl halides, trityl halides, 1-halo-1-phenylalkanes wherein the alkyl chain has from 1 to 22 carbon atoms such as 1-halo-1-phenylethane; 1-halo-1-phenyl propane; and 1-halo-1-phenyloctadecane; substituted benzyl moieties such as would be derived from ortho-, meta- and para-chlorobenzyl halides, para-methoxybenzyl halides; ortho-, meta-, and para-nitrilobenzyl halides; and ortho-, meta- and para-alkylbenzyl halides wherein the alkyl chain contains from 1 to 22 carbon atoms; and fused ring benzyl-type moieties such as would be derived from 2-halomethylnaphthalene, 9-halomethylanthracene and 9-halomethylphenanthrene, wherein the halo group would be defined as chloro, bromo, iodo, or any other such group which serves as a leaving group in the nuclcophilic attack of the benzyl type moiety such that the nuclophile replaces the leaving group on the benzyl type moiety.

Representative examples of useful alkyl groups which may be lineal and branched, cyclic and acyclic include methyl; ethyl; propyl; 2-propyl; iso-butyl; cyclopentyl; and cyclohexyl.

The alkyl radicals may also be derived from other natural oils, both substituted and unsubstituted such as those described above, including various vegetable oils, such as tallow oil, corn oil, soybean oil, cottonseed oil, castor oil and the like, as well as various animal oils and fats.

The salt anion is preferably selected from the group consisting of chloride and bromide, and mixtures thereof, and is more preferably chloride, although other anions such as acetate, hydroxide, nitrite, etc., may be present in the organic cationic compound to neutralize the cation. A representative formula for the salt is

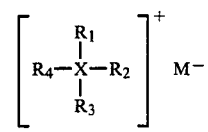

wherein $R_1$ is selected from the group consisting of a beta,gamma-unsaturated alkyl group and hydroxyalkyl group having 2 to 6 carbon atoms and mixtures thereof; $R_2$ is a long chain alkyl group having 12 to 60 carbon atoms; $R_3$ and $R_4$ are selected from a group consisting of an $R_1$ group, an aralkyl group, and alkyl group having from 1 to 22 carbon atoms and mixtures thereof; X is phosphorous or nitrogen; and wherein $M^-$ is an anion selected from the group consisting of Cl—, Br—, 1—, $NO_2$—, OH— and $C_2H_3O_2$—.

The organophilic, organo-modified clays which are particularly suitable for use in the high-solids coating composition of the present invention when an essentially non-polar aromatic or aliphatic solvent is employed, can be prepared by admixing the smectite-type clay, quaternary ammonium compound and water together, preferably at a temperature within the range of from 20° C. to 100° C., and most preferably from 35° C. to 77° C. for a period of time sufficient for the organic compound to coat the clay particles, followed by filtering, washing, drying and grinding.

The clay is preferably dispersed in water at a concentration from about 1 to 80% and preferably 2% to 7%, the slurry optionally centrifuged to remove non-clay impurities which constitute about 10% of the starting clay composition, the slurry agitated and heated to a temperature in the range of from 35° C. to 77° C. The quaternary amine salt is then added in the desired milliequivalent ratio, preferably as a liquid in isopropanol or dispersed in water and the agitation continued to effect the reaction.

The amount of organic cation added to the smectite-type clay should be sufficient to impart to the clay the enhanced dispersion characteristic desired. This amount is defined as the milliequivalent ratio which is the number of milliequivalents (M.E.) of the organic cation in the organoclay per 100 grams of clay, 100% active clay basis. The organophilic, organo-modified clay should have a milliequivalent ratio of from 90 to 140 and preferably 100 to 130. It will be recognized that the preferred milliequivalent ratio within the range of from 90 to 140 will vary depending on the characteristics of the organic solvent system to be employed with the organophilic, organo-modified clay. These organo-modified clays are effective in both aliphatic and aromatic solvents as well as moderately polar solvents.

Additional descriptions of organo-modified clays suitable for the high-solids coating composition of the present invention can be found in U.S. Pat. Nos. 4,105,578, 2,531,427, and published U.K. patent application No. GB 2 107 693 A the disclosures of which are hereby incorporated by reference.

In a particularly preferred embodiment of the invention an organo-modified clay is utilized in combination with organic polymer microparticles in a high-solids coating composition of the invention. Preferred high-solids coating compositions employing the combination of organo-modified clay and organic polymer microparticles advantageously tend to provide cured films containing metallic pigment which exhibit better pattern control and lightness of face (or metallic brightness) than similar cured films prepared from high-solids coating compositions which contain organo-modified clay without organic polymer microparticles or which contain organic polymer microparticles without organo-modified clay.

Organic polymer microparticles suitable for the method of the invention have a diameter in the range of from about 0.01 to about 10 microns (from about 10 nanometers to about 10,000 nanometers). Organic polymer microparticles and methods of preparing them are known and are described, for example, in U.S. Pat. Nos. 4,025,474, 4,055,607, 4,075,141, 4,115,472, 4,147,688, 4,180,489, 4,242,384, 4,268,547, 4,220,679 and 4,290,932 the disclosures of which are hereby incorporated by reference. The following is a description of a highly crosslinked, preferred type of organic polymer microparticles which is just one of a number of types of organic polymer microparticles which may be used in combination with the organo-modified clay in the particularly preferred, organic solvent-based, high-solids coating composition of the present invention. Description, in addition to that immediately below, of this highly crosslinked, preferred type of organic polymer microparticles, can be found in U.S. Pat. No. 4,147,688 and U.S. Pat. No. 4,180,619 the disclosures of which are hereby incorporated by reference.

The preferred organic polymer microparticles are crosslinked acrylic polymer microparticles and are prepared by the free radical addition copolymerization of alpha, beta-ethylenically unsaturated monocarboxylic acid, at least one other copolymerizable monoethylenically unsaturated monomer and crosslinking monomer selected from the group consisting of (1) epoxy group-containing compound and (2) a mixture of alkylenimine and organoalkoxysilane in the presence of a polymeric dispersion stabilizer and dispersing liquid in which the crosslinked acrylic polymer particles are insoluble, thereby forming a non-aqueous dispersion of the crosslinked acrylic polymer microparticles of relatively high concentration. The reaction is carried out at elevated temperature such that the dispersion polymer forms and is crosslinked; usually the temperature should be between about 50° C. and 150° C.

Examples of alpha, beta-ethylenically unsaturated monocarboxylic acid which may be used for preparation of the preferred organic polymer microparticles are acrylic acid, methacrylic acid, ethacrylic acid, alpha-chloroacrylic acid, crotonic acid, isocrotonic acid, tiglic acid and angelic acid. The preferred alpha, beta-ethylenically unsaturated monocarboxylic acids are acrylic acid and methacrylic acid. Methacrylic acid is especially preferred. The amount of alpha, beta-ethylenically unsaturated monocarboxylic acid employed is usually in the range of from about 0.5 percent to about 15 percent by weight of the monomers used in the copolymerization process.

Various other monoethylenically unsaturated monomers may be copolymerized with the acid monomer to prepare the preferred organic polymer microparticles. Although essentially any copolymerizable monoethylenic monomer may be utilized, depending upon the properties desired, the preferred monoethylenically unsaturated monomers are the alkyl esters of acrylic or methacrylic acid, particularly those having from about 1 to about 4 carbon atoms in the alkyl group. Illustrative of such compounds are the alkyl acrylates, such as methyl acrylate, ethyl acrylate, propyl acrylate, and butyl acrylate and the alkyl methacrylates, such as methyl methacrylate, ethyl methacrylate, propyl methacrylate and butyl methacrylate. Other ethylenically unsaturated monomers which may advantageously be employed include, for example, the vinyl aromatic hydrocarbons, such as styrene, alpha-methyl styrene, vinyl toluene, unsaturated esters of organic and inorganic acids, such as vinyl acetate, vinyl chloride and the like, and the unsaturated nitriles, such as acrylonitrile, methacrylonitrile, ethacrylonitrile, and the like. From about 70 percent to about 99 percent by weight of such monoethylenically unsaturated monomers, based on the weight of monomer solids can be utilized.

As indicated above, the crosslinking monomer employed for preparation of the preferred organic polymer microparticles is selected from the group consisting of (1) epoxy group-containing compound and (2) a mixture of alkylenimine and organoalkoxysilane, the epoxy group-containing compound being preferred.

A particularly preferred class of epoxy-containing compounds which may be utilized are monoepoxide compounds which additionally contain ethylenic unsaturation. Illustrative of such preferred compounds are, for example, glycidyl acrylate and glycidyl methacrylate.

Various alkylenimines can be utilized to prepare the preferred organic polymer microparticles including substituted alkylenimines. The preferred class of such amines are those of the formula:

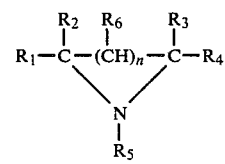

where $R_1$, $R_2$, $R_3$, $R_4$ and $R_5$ are each hydrogen; alkyl, such as methyl, ethyl, propyl, or the like, having, for example, up to about 20 carbon atoms; aryl, such as phenyl or the like; aralkyl, such as tolyl, xylyl or the like; or aralkyl, such as benzyl, phenethyl or the like. $R_6$ in the above formula is hydrogen or a lower alkyl radical usually having not more than about 6 carbon atoms, and n is an integer from 0 to 1.

It is intended that the groups designated by the above formula include substituted radicals of the classes indicated where the substituent groups do not adversely affect the basic nature of the imine in the reaction. Such substituents can include the groups such as cyano, halo, amino, hydroxy, alkoxy, carbalkoxy and nitrile. The substituted groups may thus be cyanoalkyl, haloalkyl, aminoalkyl, hydroxyalkyl, alkoxyalkyl, carbalkoxyalkyl, and similar substituted derivatives of aryl, alkaryl and aralkyl groups where present.

A number of specific examples of alkylenimines within the class described are as follows:
Ethylenimine (aziridine)
1,2-propylenimine (2-methyl aziridine)
1,3-propylenimine (azetidine)
1,2-dodecylenimine (2-decyl aziridine)
1,1-dimethyl ethylanimine (2,2-dimethyl aziridine)
Phenyl ethylenimine (2-phenyl aziridine)
Benzyl ethylenimine (2-phenylmethyl aziridine)
Hydroxyethyl ethylenimine (2-(2-hydroxyethyl)aziridine)
Aminoethyl ethylenimine (2-(2-aminoethyl)aziridine)
2-methyl propylenimine (2-methyl azetidine)
3-chloropropyl ethylenimine (2-(3-chloropropyl)aziridine)
Methoxyethyl ethylenimine (2-(2methoxyethyl)aziridine)
Dodecyl aziridinyl formate (dodecyl 1-aziridinyl carboxylate)
N-ethyl ethylenimine (1-ethyl aziridine)
N-(2-aminoethyl)ethylenimine (1-(2-aminoethyl)aziridine
N-(phenethyl)ethylenimine (1-(2-phenylethyl)aziridine)
N-(2-hydroxyethyl)ethylenimine (1-(2-hydroxyethyl)aziridine)
N-(cyanoethyl)ethylenimine (1-cyanoethyl aziridine)
N-phenyl ethylenimine (1-phenyl aziridine)
N-(p-chlorophenyl)ethylenimine (1-(4-chlorophenyl)aziridine)

Because of their availability and because they have been found to be among the most effective, the preferred imines are hydroxyalkyl-substituted alkylenimines, such as N-hydroxyethyl ethylenimine and N-hydroxyethyl propylenimine.

Organoalkoxysilane monomers which may be employed to prepare the organic polymer microparticles are the acrylatoalkoxysilanes, methacrylatoalkoxysilanes and the vinylalkoxysilanes. Illustrative of such compounds are acryloxypropyltrimethoxysilane, gamma-methacryloxypropyltrimethoxysilane, gamma-methacryloxypropyltriethoxysilane, gamma-methacryloxypropyl-tris(2-methoxyethoxy)silane, vinyltrimethoxysilane, vinyltriethoxysilane, vinyltris(2-methoxyethoxy)silane and the like. Of these organoalkoxysilanes, gamma-methacryloxypropyltrimethoxysilane is especially preferred.

The proportion of such crosslinking monomer employed to prepare the preferred organic polymer microparticles may range from 0.5 percent to 15 percent by weight of the monomers used in the copolymerization process. When the crosslinking monomer is a mixture of alkylenimine and organoalkoxy-silane, the mole ratio of the alkylenimine to the alpha, beta-ethylenically unsaturated monocarboxylic acid used to prepare the polymer is generally in the range of from 0.5:1 and 1.5:1 and the mole ratio of the organoalkoxy-silane to the alpha, beta-ethylenically unsaturated monocarboxylic acid used to prepare the polymer is generally in the range of from 1.5:1 to 3.5:1.

The monoethylenically unsaturated monomer, acid monomer and crosslinking monomer are polymerized in a dispersing liquid which solubilizes the monomers but in which the resulting polymers are essentially not soluble and form dispersed polymer particles. The dispersing liquid is generally a hydrocarbon medium consisting essentially of liquid aliphatic hydrocarbons. A pure aliphatic hydrocarbon or a mixture of two or more may be employed. To the extent that any particular polymer produced is mostly insoluble in the hydrocarbon medium resulting, the essentially aliphatic hydrocarbon may be modified by the incorporation of other solvent materials such as aromatic or naphthenic hydrocarbons, and in certain instances, the amount of such non-aliphatic component may attain as high as 49 percent by weight of the entire liquid medium. However, the liquid medium preferably consists essentially of aliphatic hydrocarbons and, in general, the compositions contain less than 25 percent by weight based on the weight of the liquid medium of an aromatic hydrocarbon and often none at all at this stage.

It is essential that the hydrocarbon be of liquid character, but it may have a wide boiling range from a minimum of about 30° C. (in which case high pressures may be needed in the polymerization) to a maximum which may be as high as 300° C. For most purposes, the boiling point should be from about 50° C. up to about 235° C.

Examples of dispersing liquids useful herein are pentane, hexane, heptane, octane, mixtures of the same, and the like.

Ordinarily, the polymerizable composition of monomers and dispersing liquid should contain from about 30 to about 80 percent by weight of the dispersing liquid. It is understood, however, that the monomeric solution need contain only that amount of dispersing liquid necessary to solubilize the monomers and maintain the resulting polymers in a dispersed state after polymerization.

The monomers are polymerized in the presence of a dispersion stabilizer. The dispersion stabilizer employed in producing the microparticles of the invention is a compound, usually polymeric, which contains at least two segments of which one segment is solvated by the dispersing liquid and a second segment is of different polarity than the first segment and is relatively insoluble (compared to the first segment) in the dispersing liquid.

Included among such dispersion stabilizers are polyacrylates and polymethacrylates, such as poly(lauryl)methacrylate and poly(2-ethylhexyl acrylate); diene polymers and copolymers such as polybutadiene and degraded rubbers; aminoplast resins, particularly highly naphtha-tolerant compounds such as melamine-formaldehyde resins etherified with higher alcohols (e.g., alcohols having 4 to 12 carbon atoms), for example, butanol, hexanol, 2-ethylhexanol, etc., and other aminoplasts of similar characteristics such as certain resins based on urea, benzoguanamine, and the like; and various copolymers designed to have the desired characteristics, for example, polyethylenevinyl acetate copolymers.

The presently preferred dispersion stabilizers are graft copolymers comprising two types of polymer components of which one segment is solvated by the aliphatic hydrocarbon solvent and is usually not associated with polymerized particles of the polymerizable ethylenically unsaturated monomer and the second type is an anchor polymer of different polarity from the first type and being relatively non-solvatable by the aliphatic hydrocarbon solvent and capable of anchoring with the polymerized particles of the ethylenically unsaturated monomer, said anchor polymer containing pendant groups capable of copolymerizing with ethylenically unsaturated monomers.

The preferred dispersion stabilizers are comprised of two segments. The first segment (A) comprises the reaction product of (1) a long-chain hydrocarbon molecule which is solvatable by the dispersing liquid and contains a terminal reactive group and (2) an ethylenically unsaturated compound which is copolymerizable with the ethylenically unsaturated monomer to be polymerized and which contains a functional group capable of reacting with the terminal reactive group of the long-chain hydrocarbon molecule (1).

Generally, the solvatable segment (A) is a monofunctional polymeric material of molecular weight of about 300 to about 3,000. These polymers may be made, for example, by condensation reactions producing a polyester or polyether. The most convenient monomers to use are hydroxy acids or lactones which form hydroxy acid polymers. For example, a hydroxy fatty acid such as 12-hydroxystearic acid may be polymerized to form a nonpolar component solvatable by such nonpolar organic liquids as aliphatic and aromatic hydrocarbons. The polyhydroxy stearic acid may then be reacted with a compound which is copolymerizable with the acrylic monomer to be polymerized, such as glycidyl acrylate or glycidyl methacrylate. The glycidyl group would react with the carboxyl group of the polyhydroxy stearic acid and the polymer segment (A) would be formed.

Somewhat more complex, but still useful, polyesters may be made by reacting diacids with diols. For example, 1,12-dodecanediol may be reacted with sebacic acid or its diacid chloride to form a component solvatable by aliphatic hydrocarbons.

The preferred polymeric segment (A) of the dispersion stabilizer is formed by reacting poly-(12-hydroxystearic acid) with glycidyl methacrylate.

The second polymeric segment (B) of the dispersion stabilizer is of polarity different from the first segment (A) and, as such, is relatively non-solvated by the dispersing liquid and is associated with or capable of anchoring onto the acrylic polymeric particles formed by the polymerization and contains a pendant group which is copolymerizable with the acrylic monomer. This anchor segment (B) provides around the polymerized particles a layer of the stabilizer. The solvated polymer segment (A) which extends outwardly from the surface of the particles provides a solvated barrier which sterically stabilizes the polymerized particles in dispersed form.

The anchor segment (B) may comprise copolymers of (1) compounds which are readily associated with the acrylic monomer to be polymerized such as acrylic or methacrylic esters, such as methyl acrylate, methyl methacrylate, ethyl acrylate, ethyl methacrylate, butyl acrylate, butyl methacrylate, 2-ethylhexyl acrylate, octyl methacrylate, and the like, with (2) compounds which contain groups copolymerizable with the acrylic monomer to be polymerized and which contain groups which are reactive with the polymeric segment (A), such as glycidyl-containing acrylates and methacrylates, such as glycidyl acrylate and glycidyl methacrylate. These copolymers are further reacted with polymerizable ethylenically unsaturated acids, such as acrylic acid, methacrylic acid, 3-butenoic acid, crotonic acid, itaconic acid, and others mentioned previously which contain pendant groups which are copolymerizable with the acrylic monomer.

The preferred polymeric segment (B) is a terpolymer of methyl methacrylate, glycidyl methacrylate, and methacrylic acid.

The segments (A) and (B) are usually combined entities, the segment (A) being attached to the backbone of the graft copolymer and the segment (B) being carried in or on the backbone.

The monomer solution containing the stabilizer preferably contains from about 1 to about 25 percent by weight of the stabilizer. That is, the amount of dispersion stabilizer used is in the range of from about 1 to about 25 percent by weight based on the weight of monomers and dispersion stabilizer used in the copolymerization process.

The polymerization may be carried out in a conventional manner, utilizing heat and/or catalysts and varying solvents and techniques. Generally, a free radical catalysts such as cumene hydroperoxide, benzoyl peroxide or similar peroxygen compound, or an azo compound such as azobis(isobutyronitrile) is employed.

The resultant non-aqueous acrylic dispersion consists essentially of microgel particles (i.e., crosslinked acrylic polymer particles) dispersed therein. These particles have particle sizes ranging from 0.1 to 10 microns. Depending upon the original concentration of monomer solids, non-aqueous dispersions consisting essentially of the microgel particles can be produced by the process at relatively high concentrations. The term "relatively high concentration" as employed herein refers to solids level of the non-aqueous dispersion. Thus, the process permits the production of non-aqueous dispersions of microgel particles having solids contents of from 20 to 60 percent by weight or even higher. In the preparation of such polymeric microparticles, methyl methacrylate, methacrylic acid and glycidyl methacrylate are the especially preferred monomers.

In addition to the above components the compositions of the invention may contain optional ingredients which may be employed in their customary amounts for their customary purposes provided they do not seriously interfere with good coatings practice. Examples of these optional ingredients include various fillers; plasticizers; antioxidants; mildewcides and fungicides; surfactants; various catalysts to promote drying or curing; resinous pigment dispersants or grinding vehicles; various flow control agents including, for example, thixotropes and additives for sag resistance and/or pigment orientation; and other such formulating additives.

The amounts of the materials in the high-solids coating composition including the organo-modified clay can vary widely. Generally the crosslinkable resin constitutes from 15 percent to 95 percent by weight, typically from 35 percent to 65 percent by weight, of the coating composition.

Generally the amount of organo-modified clay can range from 0.5 percent to 20 percent by weight, typically from 1 percent to 12 percent by weight, based on the sum of the weights of the crosslinkable resin, optional crosslinking agent, and organo-modified clay in the embodiment of the invention wherein organic polymer microparticles are not present. In the particularly preferred embodiment in which organo-modified clay and organic polymer microparticles are present in a high-solids coating composition of the invention, generally the amount of organo-modified clay plus the amount of organic polymer microparticles can range from 0.5 percent to 30 percent by weight, typically from 1 percent to 12 percent by weight, based on the sum of the weights of the crosslinkable resin, optional crosslinking agent, organo-modified clay, and organic polymer microparticles. Moreover, generally the ratio of the weight of the organo-modified clay to the weight of the organic polymer microparticles in the particularly preferred embodiment of the invention ranges from 1:4 to 4:1.

The amount of solvents and/or diluents constituting the solvent system for the crosslinkable resin and optional crosslinking agent also may vary widely. Generally the total amount of solvents and/or diluents may range from 0 to 60 percent by weight, typically from 25 to 55 percent by weight, of the coating composition.

The amount of the optional crosslinking agent for the crosslinkable resin of a high-solids coating composition of the invention generally may range from 0 to 50 percent by weight, typically from 10 to 40 percent by weight based on the sum of the weights of the crosslinkable resin, optional crosslinking agent, organo-modified clay, and when present the organic polymer microparticles.

The amount of pigment particles when present in the coating composition is likewise subject to wide variation. Generally the pigment is present in an amount ranging from 1 to 60 percent by weight, typically from 2 to 40 percent by weight, based on the sum of the weights of the film-forming resin, the organo-modified clay, optional crosslinking agent, and when present the organic polymer microparticles. When metallic flakes are employed as pigment in the coating composition, they generally are present in the range of from 1 to 20 percent by weight, typically from 2 to 12 percent by weight, based on the sum of the weights of the crosslinkable resin, the organo-modified clay, optional crosslinking agent, and when present the organic polymer microparticles.

Compositions of the invention can be used for example to coat a wide variety of substrates such as metals, wood, glass, cloth, plastics, fiberglass, foams and the like as well as over primers. The composition can be applied to the substrate using any application technique known in the art such as roll coating, curtain coating, dip coating, doctor blade coating, spraying and the like although spraying is most often employed.

The high-solids coating compositions can be cured in a variety of ways, typically at temperatures in the range of from about 20° C. to about 260° C. Some of the crosslinkable resins such as air-curable alkyds for example may be cured by exposure to the oxygen in air. Many of the coating compositions contain a crosslinking agent. When a crosslinking agent is present, the coating compositions are usually cured by the application of heat. Although a curing temperature may vary widely it is typically in the range of about 80° Celsius (C.) to about 150° C. Similarly, curing times may be subject to wide variation, but typically range from about 10 minutes to about 45 minutes. Particularly when heat curing is employed, it is sometimes desirable to allow the coating composition to flash at ambient temperature for up to about 30 minutes, typically up to about 5 minutes, before curing.

Compositions of the invention provide a number of advantages. By incorporating the organo-modified clay in the composition, the amount of sagging of the coating compositions on a verticle substrate during curing, including curing by heating, can be substantially reduced or even eliminated often without the use of known organic microgels. Moreover, this advantage is especially important since sag control can be an especially serious problem in curing a high-solids coating composition. As used herein, the term "high solids coating composition" is intended to include those coating compositions having a total solids content of at least 40 percent by weight, preferably at least 50 percent by weight, based on the total weight of the coating composition and which can be applied to the substrate by conventional spraying techniques. Typically, a high-solids coating composition which can be applied to the substrate by conventional spraying techniques has a No. 4 Ford Cup viscosity of less than 25 seconds when the total solids content of the coating composition is at least 40 percent by weight. The solids are understood to include the essentially nonvolatile components of the coating composition including, for example, crosslinkable resin, organo-modified clay, optional organic polymer microparticles and pigment particles. It is to be understood that the optional crosslinking agents, examples of which have been described above, are intended to be included for the purpose of the determination of the solids content of the coating composition.

Additionally, when the organo-modified clay is incorporated in a high gloss coating composition, the composition surprisingly can be cured to a high gloss film without the occurrence of substantial flattening effects (i.e., substantial gloss reduction) which certain particulate silicas which have previously been used in coating compositions provide. This is important for example where high gloss coatings are desired as in automotive coatings applications. Equally important, where metallic flakes are employed as pigment in the coating composition, the incorporation of the inorganic microparticles provides excellent control of the pigment orientation in the cured film such that the dried or cured coating exhibits a high degree of pattern control as evidenced by excellent variable appearance when viewed at different angles to a direction normal to the coated surface and excellent metallic brightness (sometimes referred to as brightness of face or lightness of face) when viewed from a direction essentially normal to the coated substrate. Moreover, this high degree of pattern control can be achieved utilizing a composition of the invention without the necessity of using known organic polymer microgels which have been synthesized for this purpose, although it is to be understood that a particularly preferred embodiment of the present invention includes coating compositions wherein organic polymer microparticles are employed in combination with the organo-modified clay in the high-solids coating composition. As discussed previously, particularly preferred high-solids coating compositions employing a combination of organo-modified clay and organic polymer microparticles (microgel) advantageously tend to provide cured films containing metallic pigment which exhibit better lightness of face (or metallic brightness) than similar cured films prepared from high-solids coating compositions which contain organo-modified clay without organic polymer microparticles or which contain organic polymer microparticles without organo-modified clay.

A particular advantage of the compositions of the present invention is that they tend to have a high degree of storage stability. For ex ample, in an accelerated test, a pigmented, high-solids composition of the present invention could be stored at 140° F. (60° C.) for at least as long as 3 days and still provide cured coatings exhibiting excellent pigment orientation in the cured film. In particular, high-solids coating compositions of the invention containing metallic flake pigments, such as nonleafing aluminum flakes, can be stored at 140° F. (60° C.) for at least 3 days and still provide excellent pattern control as evidenced by an excellent lightness (or brightness) of face when viewed from a direction essentially normal to the surface of the cured coating and by an excellent variable appearance when viewed from different angles to a direction normal to the surface of the cured coating.

In summary, high-solids compositions of the invention can be utilized to provide not only excellent rheological properties such as excellent sag control during heat curing, but also can provide excellent pattern control even after heat aging. Moreover, these benefits can be obtained while still achieving a very high degree of gloss in coatings applications requiring high gloss films as for example in automotive coatings.

The following examples are intended to further illustrate the present invention. As used in the body of the specification, examples and claims, all percents, ratios and parts are by weight unless otherwise specifically indicated. Whenever used herein "pbw" means "parts by weight."

EXAMPLES 1-5

Examples 2 through 4 illustrate coating compositions of the invention in which an organo-modified clay is utilized either alone (Example 4) or in combination with organic polymer microparticles (Examples 2 and 3) to provide cured films having an excellent combination of appearance properties. Examples 1 and 5 are comparative examples. Example 1 utilizes neither an organo-modified clay nor organic polymer microparticles in the coating composition. Example 5 utilizes organic polymer microparticles but no organo-modified clay in the coating composition.

(a) Each of the coating compositions numbered 1 through 5 respectively in the following TABLE 1 is prepared as follows. Components (1) through (5) in the amounts in parts by weight (pbw) as set forth in TABLE 1 are introduced into a container and are mixed together utilizing a conventional stirrer. Thereafter, components (6) through (10) in the amounts as set forth in TABLE 1 are added without stirring to the container in the order indicated in TABLE 1 (i.e., component 6 is added before component 7 and so forth). After all of components (1) through (10) have been introduced into the container, the contents of the container are mixed together utilizing a conventional paint shaker. Each of the coating compositions having a total percent by weight spray solids as set forth in TABLE 1 has a No. 4 Ford Cup and/or a No. 1 Fisher Cup viscosity as indicated in TABLE 1.

TABLE 1

| Example No. | 1 | 2 | 3 | 4 | 5 |
|---|---|---|---|---|---|
| Component (Amount in pbw[1]) | | | | | |
| (1) Xylene | 35.5 | 33.45 | 34.03 | 35 | 32.1 |
| (2) Solvent blend[2] | 56.8 | 53.2 | 54.2 | 55.5 | 51.2 |
| (3) Organo-modified clay[3] | 0 | 1 | 2 | 3 | 0 |
| (4) Dispersion of polymer microparticles[4] | 0 | 9 | 4.5 | 0 | 13.6 |
| (5) CYMEL 1130[5] | 37.5 | 37.5 | 37.5 | 37.5 | 37.5 |
| (6) Polyester resin[6] | 38.8 | 34.4 | 34.4 | 35.6 | 32.2 |
| (7) Polyester-urethane plasticizer[7] | 28.6 | 28.6 | 28.6 | 28.6 | 28.6 |
| (8) Polyurethane plasticizer[8] | 10 | 10 | 10 | 10 | 10 |
| (9) Pigment dispersion[9] | 8.3 | 8.3 | 8.3 | 8.3 | 8.3 |
| (10) Curing catalyst[10] | 1.5 | 1.5 | 1.5 | 1.5 | 1.5 |
| Percent Total Spray Solids | 47.5 | 48 | 48 | 48 | 48 |
| No. 1 Fisher Cup Viscosity in seconds | 28 | 35 | 50 | 50 | 33 |
| No. 4 Ford Cup Viscosity in seconds | — | — | 16 | 16 | — |

[1] pbw means "parts by weight".
[2] A solvent blend consisting of 16.2 percent by weight of primary amyl alcohol, 50.3 percent by weight of Cellosolve acetate, and 33.5 percent by weight of isobutyl acetate.
[3] BENTONE SD-2 from NL Industries, Inc.
[4] A dispersion of organic polymer microparticles at 44 percent by weight solids in 56 percent by weight of a solvent mixture (containing 1.19 percent toluene, 2.67 percent VM & P naphtha, 6.91 percent butyl acetate, 26.95 percent ISOPAR E from EXXON Corp., and 62.93 percent heptane). The dispersion of organic polymer microparticles is prepared from 139.9 pbw of heptane, 59.9 pbw of ISOPAR E from EXXON Corp., 147.2 pbw of methylmethacrylate, 7.6 pbw of glycidylmethacrylate, 37.6 pbw of a dispersion stabilizer solution, 0.447 pbw of ARMEEN DMCD (dimethyl cocoamine), 1.081 pbw of VAZO 67 initiator, 1.592 pbw of n-octyl mercaptan, and 4.626 pbw of methacrylic acid. The dispersion stabilizer solution contained 40 percent by weight solids and 60 percent by weight of a mixture of solvents. The dispersion stabilizer is a polymer prepared by graft polymerizing 49.5 percent by weight of a reaction product of 10.8 percent by weight of glycidyl methacrylate and 89.2 percent by weight of 12-hydroxystearic acid, with 45.4 percent by weight of methylmethacrylate and 4.2 percent by weight of glycidyl methacrylate, wherein the resulting copolymer product containing pendant epoxy groups is reacted with 0.9 percent by weight of methacrylic acid. The mixture of solvents of the dispersion stabilizer solution contains 68.5 percent by weight of butylacetate, 26.3 percent by weight of VM & P naphtha, and 5.2 percent by weight of toluene. The dispersion of organic polymer microparticles is prepared according to the teachings of U.S. Pat. No. 4,147,688 hereby incorporated by reference.
[5] A fully alkylated melamine-formaldehyde condensate having a molar ratio of about 75 percent methoxymethyl groups to about 25 percent butoxymethyl groups available from American Cyanamid Company.
[6] A polyester-polyol resin having a calculated solids content of 90 percent by weight in 10 percent by weight of methylamyl ketone prepared by reacting neopentylglycol (NPG) and hexahydrophthalic anhydride (HHPA) in a ratio of 2 moles of NPG to1 mole of HHPA; and having a number average molecular weight of from 375-400, a hydroxyl number of 271, an acid value of 8.3, and a Gardner-Holdt bubble tube viscosity of Z-3.
[7] A polyester-urethane resin having a calculated solids content of 70 percent by weight in 30 percent by weight of a solvent mixture (containing 25.9 percent by weight of methylisobutyl ketone and 74.1 percent by weight of Cellosolve acetate); prepared by reacting 76.25 pbw of epsiloncaprolactone, 10.5 pbw of diethyleneglycol, 12.3 pbw of dicyclohexylmethane-4,4'-diisocyanate, 0.88 pbw of dimethylolpropionic acid, and 0.09 pbw of triphenyl phosphite; and having a number average molecular weight of 800, a weight average molecular weight of 1600, a hydroxyl number of 38, an acid value of 2.6, and a Gardner-Holdt bubble tube viscosity of S.
[8] A polyester-urethane resin having a solids content of 50 percent by weight in 50 percent by weight of a solvent mixture (containing 3.9 percent by weight of butanol, 9.1 percent by weight of isopropyl alcohol, 36.2 percent by weight of methylisobutyl ketone, and 50.73 percent by weight of methylethyl ketone); prepared by reacting 71.8 pbw of epsilon-caprolactone, 18.8 pbw of dicyclohexylmethane -4,4'-diisocyanate, 6 pbw of diethyleneglycol, 3.2 pbw of dimethylolpropionic acid, and 0.17 pbw of monoethanolamine; and having a number average molecular weight of about 8,000, a hydroxyl number of from 15-20, an acid value of 6.65, and a Gardner-Holdt bubble tube viscosity of X.
[9] A pigment dispersion prepared by stirring 48.4 pbw of 5245 AR Aluminum from Silberline Co. (containing 62 percent by weight of aluminum flakes dispersed in an organic solvent composition) with 30 pbw of CYMEL 1130 (identified above) and 21.6 pbw of Cellosolve acetate.
[10] A solution containing 40 percent by weight of dodecylbenzene sulfonic acid and 60 percent by weight of isoproyl alcohol.

(b) Each of the coating compositions is spray applied in four coats to each panel of a set of two metal panels with a 1 minute flash at ambient conditions between coating applications to form a resultant coating on each of the panels. The resultant coating on each of the panels is allowed to flash for 5 minutes at ambient conditions and immediately thereafter is cured for 30 minutes at 250 degrees Fahrenheit (121 degrees Celsius) one panel of each of the sets of two panels being cured in a horizontal position and one panel of each of the sets of two panels being cured in a vertical position. The average dry film thicknesses for the cured films on each set of two panels for Examples 1-5 are 1.6 mil, 1.57 mil, 1.66 mil, 1.5 mil and 1.5 mil respectively.

(c) The resulting cured films are examined and compared visually for pattern control, lightness of face (or metallic brightness), and gloss. A cured film having excellent pattern control exhibits a completely uniform distribution of metallic flake pigment in a planar direction across the substrate as determined visually and is free of any visually noticeable, localized discontinuities in the distribution of metallic flake pigment and any visually noticeable defects such as, for example, short hairlike features in the pattern (believed to be attributable to an unacceptably high degree of substantially nonhorizontal rather than horizontal alignment to the substrate of small areas of metallic flake pigment).

The comparative ratings for pattern control, lightness of face, and gloss of the resulting cured films of Examples 1 through 5 are as follows:
Pattern Control: $2>5\geq3>4>>1$
Lightness of Face: $2>5\geq3>4>>1$
Gloss: $2>5\geq3>4>>1$ In the comparative ratings immediately above $>$ means "better than", $>>$ means "much better than", and $\geq$ means "slightly better than although close".

Thus the cured films prepared from compositions of the invention (i.e., Nos. 2, 3 and 4) provide an excellent combination of pattern control, lightness of face, and gloss compared to the cured films prepared from the comparative compositions.

EXAMPLES 6-10

Examples 7 through 9 illustrate compositions of the invention utilized in a "color plus clear" coating method in which an organo-modified clay and organic polymer microparticles are utilized in combination in a basecoating composition of the invention to provide an excellent combination of appearance properties in the resulting cured composite films (i.e., transparent topcoat over pigmented basecoat). Examples 6 and 10 are comparative examples. Example 6 utilizes neither an organo-modified clay nor organic polymer microparticles in the basecoating composition. Example 10 utilizes organic polymer microparticles but no organo-modified clay in the basecoating composition.

(a) Each of the five basecoating compositions, numbered 6 through 10 respectively in the following TABLE 2 is prepared as follows. Components (1) through (3) in the amounts in parts by weight (pbw) as set forth on TABLE 2 are introduced into a container and are mixed together utilizing a conventional stirrer. Thereafter, components (3) through (10) in the amounts as set forth in TABLE 2 are added without stirring to the container in the order indicated in TABLE 2 (i.e., component 3 is added before component 4 and so forth). After all of components (1) through (10) have been introduced into the container, the contents of the container are mixed together utilizing a conventional stirrer. Next, component (11) in the amount as set forth in TABLE 2 is admixed with the contents of the container to produce a basecoating composition having the percent by weight total spray solids as indicated in TABLE 2. Each of the basecoating compositions having a total percent by weight spray solids as set forth in TABLE 2 has a No. 4 Ford Cup viscosity of 14 seconds.

TABLE 2

| Basecoating Compositions Example No. | 6 | 7 | 8 | 9 | 10 |
|---|---|---|---|---|---|
| Component (Amount in pbw[1]) | | | | | |
| (1) n-propanol | 12 | 12 | 12 | 12 | 12 |
| (2) Cellosolve acetate/isobutyl acetate[2] | 64 | 38 | 41 | 30 | 52 |
| (3) Dispersion of polymer microparticles[3] | 0 | 23 | 18 | 11.4 | 23 |
| (4) CYMEL 1130[4] | 23 | 23 | 23 | 23 | 23 |
| (5) Dispersion of organo-modified clay[5] | 0 | 14.3 | 14.3 | 28.6 | 0 |
| (6) Polyester Resin[6] | 44.4 | 33.3 | 35.5 | 38.9 | 33.3 |
| (7) Polyester-urethane plasticizer[7] | 28.6 | 28.6 | 28.6 | 28.6 | 28.6 |
| (8) Polyurethane plasticizer[8] | 10 | 10 | 10 | 10 | 10 |
| (9) Curing catalyst[9] | 2 | 2 | 2 | 2 | 2 |
| (10) Pigment dispersion[10] | 40 | 40 | 40 | 40 | 40 |
| (11) Cellosolve acetate | 10 | 45 | 14 | 14 | 35 |
| Percent Total Spray Solids at a 14 second, No. 4 Ford | 48% | 42% | 47% | 47% | 43% |

TABLE 2-continued

| Basecoating Compositions Example No. | 6 | 7 | 8 | 9 | 10 |
|---|---|---|---|---|---|
| Cup viscosity | | | | | |

[1]"pbw means "parts by weight".
[2]A mixture of 2 pbw of Cellosolve acetate to 1 pbw of isobutyl acetate.
[3]A dispersion of organic polymer microparticles at 44 percent by weight solids in 56 percent by weight of a solvent mixture (containing 1.19 percent toluene, 2.67 percent VM & P naphtha, 6.91 percent butyl acetate, 26.95 percent ISOPAR E from EXXON Corp., and 62.93 percent heptane). The dispersion of organic polymer microparticles is prepared from 139.9 pbw of heptane, 59.9 pbw of ISOPAR E from EXXON Corp., 147.2 pbw of methylmethacrylate, 7.6 pbw of glycidylmethacrylate, 37.6 pbw of a dispersion stabilizer solution, 0.447 pbw of AR-MEEN DMCD (dimethyl cocoamine), 1.081 pbw of VAZO 67 initiator, 1.592 pbw of n-octyl mercaptan, and 4.626 pbw of methacrylic acid. The dispersion stabilizer solution contained 40 percent by weight solids and 60 percent by weight of a mixture of solvents. The dispersion stabilizer is a polymer prepared by graft polymerizing 49.5 percent by weight of a reaction product of 10.8 percent by weight of glycidyl methacrylate and 89.2 percent by weight of 12-hydroxystearic acid, with 45.4 percent by weight of methylmethacrylate and 4.2 percent by weight of glycidyl methacrylate, wherein the resulting copolymer product containing pendant epoxy groups is reacted with 0.9 percent by weight of methacrylic acid. The mixture of solvents of the dispersion stabilizer solution contains 68.5 percent by weight of butylacetate, 26.3 percent by weight of VM & P naphtha, and 5.2 percent by weight of toluene. The dispersion of organic polymer microparticles is prepared according to the teachings of U.S. Pat. No. 4,147,688 hereby incorporated by reference.
[4]A fully alkylated melamine-formaldehyde condensate having a molar ratio of about 75 percent methoxymethyl groups to about 25 percent butoxymethyl groups available from American Cyanamid Company.
[5]A dispersion prepared by stirring 14 pbw of BENTONE SD-2 (from NL Industries, Inc.) in 28 pbw of isobutylacetate and 58 pbw of Cellosolve acetate.
[6]A polyester-polyol resin having a calculated solids content of 90 percent by weight in 10 percent by weight of methylamyl ketone prepared by reacting neopentylglycol (NPG) and hexahydrophthalic anhydride (HHPA) in a ratio of 2 moles of NPG to1 mole of HHPA; and having a number average molecular weight of from 375–400, a hydroxyl number of 271, an acid value of 8.3, and a Gardner-Holdt bubble tube viscosity of Z-3.
[7]A polyester-urethane resin having a calculated solids content of 70 percent by weight in 30 percent by weight of a solvent mixture (containing 25.9 percent by weight of methylisobutyl ketone and 74.1 percent by weight of Cellosolve acetate); prepared by reacting 76.25 pbw of epsiloncaprolactone, 10.5 pbw of diethyleneglycol, 12.3 pbw of dicyclohexylmethane 4,4'-diisocyanate, 0.88 pbw of dimethylolpropionic acid, and 0.09 pbw of triphenyl phosphite; and having a number average molecular weight of 800, a weight average molecular weight of 1600, a hydroxyl number of 38, an acid value of 2.6, and a Gardner-Holdt bubble tube viscosity of S.
[8]A polyester-urethane resin having a solids content of 50 percent by weight in 50 percent by weight of a solvent mixture (containing 3.9 percent by weight of butanol, 9.1 percent by weight of isopropyl alcohol, 36.2 percent by weight of methylisobutyl ketone, and 50.73 percent by weight of methylethyl ketone); prepared by reacting 71.8 pbw of epsilon-caprolactone, 18.8 pbw of dicyclohexylmethane -4,4'-diisocyanate, 6 pbw of diethyleneglycol, 3.2 pbw of dimethylolpropionic acid, and 0.17 pbwof monoethanolamine; and having a number average molecular weight of about 8,000, a hydroxyl number of from 15–20, an acid value of 6.65, and a Gardner-Holdt bubble tube viscosity of X.
[9]A 55 percent by weight solution of dinonylnaphthalene disulfonic acid in an alcoholic solvent composition; available as NACURE-155 from King Industries.
[10]A pigment dispersion prepared by stirring 48.4 pbw of 5245 AR Aluminum from Silberline Co. (containing 62 percent by weight of aluminum flakes dispersed in an organic solvent composition) with 30 pbw of CYMEL 1130 (identified above) and 21.6pbw of Cellosolve acetate.

(b) Each of the basecoating compositions is spray applied in two coats to each panel of a set of two metal panels with a 2 minute flash at ambient conditions between basecoating applications to form a resulting basecoat on each of the panels. The resulting basecoat on each of the panels is allowed to flash at ambient conditions for two minutes. Immediately thereafter an unpigmented transparent topcoating composition (sometimes referred to herein as a clearcoating composition) as set forth in TABLE 3 is spray applied to the basecoat in two coats with a 2 minute flash at ambient conditions between transparent topcoating applications to form a resulting transparent topcoat on the basecoat of each of the panels (hereafter referred to as a composite basecoat/topcoat). The resulting composite basecoat/topcoat on each of the panels is allowed to flash for 10 minutes at ambient conditions and immediately thereafter is cured for 30 minutes at 250 degrees Fahrenheit (°F.), one panel of each of the sets of two panels being cured in a horizontal position and one panel of each of the sets of two panels being cured in a substantially vertical position. The thicknesses of the basecoat and topcoat respectively in each of the cured basecoat/topcoat composites are about 0.8 mil and 1.5 mil respectively.

TABLE 3

| Clearcoating Composition | |
|---|---|
| Component | Amount in pbw |
| (1) Hexamethoxymethylmelamine[1] | 40 |
| (2) Acrylic resin[2] | 738 |
| (3) Cellulose acetate butyrate | 1 |
| (4) Catalyst[3] | 1 |
| (5) Butyl acetate | 68 |
| Percent Total Spray Solids at a 22 second No. 4 Ford Cup Viscosity | 55% |

[1]Hexamethoxymethylmelamine available as RESIMINE 745 from Monsanto Company.
[2]A thermosetting acrylic resin available as ACRYLOID AT-400 from Rohm and Haas Company having a solids content of 80 percent by weight in 20 percent by weight n-amyl ketone, a viscosity of from 9,000–15,000 centipoises, a density of 1.034 grams/milliter, and a flash point of 102 degrees Fahrenheit.
[3]A solution containing 40 percent by weight of para-toluenesulfonic acid in 60 percent by weight isopropanol available as Cycat 4040 from American Cyanamid Company.

(c) The resulting cured films are examined and compared visually for pattern control, absence of strike-in of the topcoat into the basecoat, and lightness of face (or metallic brightness). A cured film having excellent pattern control exhibits a completely uniform distribution of metallic flake pigment in a planar direction across the substrate as determined visually and is free of any visually noticeable, localized discontinuities in the distribution of metallic flake pigment and any visually noticeable defects such as, for example, short hairlike features in the pattern (believed to be attibutable to an unacceptably high degree of substantially nonhorizontal rather than horizontal alignment to the substrate of small areas of metallic flake pigment). A cured film which is essentially free of strike-in of the topcoat into the basecoat (sometimes alternatively said to exhibit excellent "holdout") has a high degree of gloss and a high degree of distinctness of image (DOI) such that when the film is viewed from a direction close to the normal to the surface and under, for example, a light fixture such as a fluorescent light fixture having a cross-hatch grid in front of the bulb, the reflected image of the lighted fixture in the film appears clear and sharply distinct and seems to originate deep in the film.

The comparative ratings for pattern control, holdout, and lightness of face of the resulting cured films of Examples 6 through 10 is as follows:

Pattern Control: $7 \geqq 10 \geqq 8 \geqq 9 > > > 6$
Hold-out: $8 > 7 > 10 > 9 > > > 6$
Lightness of face: $10 \geqq 7 > 8 > 9 > > > 6$ In the comparative ratings immediately above $\geqq$ means "slightly better than although close", $>$ means "better than", and $>>>$ means "very much better than".

Thus the cured films prepared according to the "color plus clear" method in which a composition of the invention is utilized for the basecoat (i.e., Nos. 7, 8 and 9) provide an excellent combination of pattern control, hold-out, and lightness of face compared to the cured films prepared according to the "color plus clear" process utilizing no pattern control agent in the basecoating composition (No. 6), and the "color plus clear" process utilizing organic polymer microparticles but no organo-modified clay in the basecoating composition (No. 10).

What is claimed is:

1. An essentially solvent-based, organic, coating composition which is conventionally sprayable at a solids content of at least 40 percent by weight of the composition at which solids content said composition has a No. 4 Ford Cup viscosity of less than 25 seconds at ambient temperature comprising:
(A) a film-forming binder system containing a crosslinkable resin having a weight average molecular weight of from 300 to 15,000 and optionally a crosslinking agent for the crosslinkable resin;
(B) an organo-modified clay produced from an organic cation, an organic anion and smectite-type clay, which organo-modified clay is stably dispersed in the coating composition in an amount of from 0.5 to 20 percent by weight based on the sum by weight of the crosslinkable resin, the organo-modified clay, and when present the crosslinking agent; and
(C) a solvent system for the crosslinkable resin and the optional crosslinking agent.

2. The coating composition of claim 1 wherein an aminoplast crosslinking agent is present, and the crosslinkable resin is selected from an acrylic resin, a polyester resin or a mixture thereof.

3. The coating composition of claim 1 additionally comprising a metallic-flake pigment.

4. The coating composition of claim 3 wherein the metallic-flake pigment comprises aluminum flakes.

5. An essentially solvent-based, organic, high-solids coating composition which is conventionally sprayable at a solids content of at least 40 percent by weight of the coating composition at which solids content said composition has No. 4 Ford Cup viscosity of less than 25 seconds at ambient temperature comprising:
(A) a film-forming binder system containing a crosslinkable resin having a weight average molecular weight of from 300 to 15,000 and optionally a crosslinking agent for the crosslinkable resin;
(B) an organo-modified clay produced from an organic cation, an organic anion and smectite-type clay, which organo-modified clay is stably dispersed in the coating composition;
(C) a solvent system for the crosslinkable resin and the optional crosslinking agent; and
(D) organic polymeric microparticles which are insoluble in the solvent system for the crosslinkable resin and which have a diameter in the range of from about 0.01 to about 10 microns;
wherein the organo-modified clay plus the organic polymer microparticles are in an amount of from 0.5 percent to 30 percent by weight based on the sum of the weights of the crosslinkable resin, organo-modified clay, organic polymer microparticles, and when present the crosslinking agent; and the ratio of the weight of the organo-modified clay to the weight of the organic polymer microparticles ranges from 1:4 to 4:1.

6. The coating composition of claim 5 wherein an aminoplast crosslinking agent is present, and the crosslinkable resin is selected from an acrylic resin, a polyester resin or a mixture thereof.

7. The coating composition of claim 5 additionally comprising a metallic-flake pigment.

8. The coating composition of claim 5 wherein the metallic-flake pigment comprises aluminum flakes.

* * * * *

UNITED STATES PATENT AND TRADEMARK OFFICE
CERTIFICATE OF CORRECTION

PATENT NO. : 4,558,075

DATED : December 10, 1985

INVENTOR(S) : Naomi R. Suss et al.

It is certified that error appears in the above-identified patent and that said Letters Patent is hereby corrected as shown below:

Column 32, Claim 8, line 49, delete "5" and insert --7--.

Signed and Sealed this

Third Day of June 1986

[SEAL]

Attest:

Attesting Officer

DONALD J. QUIGG

Commissioner of Patents and Trademarks